(12) United States Patent
Vechersky

(10) Patent No.: US 7,882,102 B2
(45) Date of Patent: Feb. 1, 2011

(54) NEAREST-NEIGHBOR GEOGRAPHIC SEARCH

(75) Inventor: Alexander Vechersky, Claremont, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 452 days.

(21) Appl. No.: 11/852,973

(22) Filed: Sep. 10, 2007

(65) Prior Publication Data

US 2009/0070293 A1    Mar. 12, 2009

(51) Int. Cl.
*G06F 7/00* (2006.01)
*G06F 17/30* (2006.01)

(52) U.S. Cl. .................. 707/716; 707/765; 707/771

(58) Field of Classification Search .............. 707/3, 707/716
See application file for complete search history.

(56) References Cited

U.S. PATENT DOCUMENTS

| | | | |
|---|---|---|---|
| 5,515,283 A | 5/1996 | Desai et al. | |
| 5,559,707 A | * 9/1996 | DeLorme et al. | 701/200 |
| 5,802,492 A | * 9/1998 | DeLorme et al. | 455/456.5 |
| 5,926,118 A | 7/1999 | Hayashida et al. | |
| 6,049,755 A | 4/2000 | Lou et al. | |
| 6,067,502 A | 5/2000 | Hayashida et al. | |
| 6,078,864 A | 6/2000 | Long et al. | |
| 6,081,609 A | 6/2000 | Narioka | |
| 6,084,989 A | 7/2000 | Eppler | |
| 6,092,076 A | 7/2000 | McDonough et al. | |
| 6,107,944 A | 8/2000 | Behr et al. | |
| 6,108,603 A | 8/2000 | Karunanidhi | |
| 6,108,604 A | 8/2000 | Fukaya et al. | |
| 6,115,669 A | 9/2000 | Watanabe et al. | |
| 6,124,826 A | 9/2000 | Garthwaite et al. | |
| 6,125,326 A | 9/2000 | Ohmura et al. | |
| 6,141,621 A | 10/2000 | Piwowarski et al. | |

(Continued)

FOREIGN PATENT DOCUMENTS

EP    2017577    1/2009

(Continued)

OTHER PUBLICATIONS

International Patent Application PCT/US2008/075839, International Search Report and Written Opinion, mailed Jan. 28, 2009.

(Continued)

*Primary Examiner*—Kuen S Lu
*Assistant Examiner*—Binh V Ho
(74) *Attorney, Agent, or Firm*—Winston Hsu; Scott Margo

(57) ABSTRACT

Disclosed herein is a method and apparatus for use in searching a geographic database to retrieve geographic objects one cell from a neighborhood of cells at a time. A cell neighborhood can be defined using a grid of cells and an initial, or center, point. A first neighborhood is identified based on its proximity to the initial search point, and corresponds to a first geographic area defined using the initial point and a distance from the initial search point in a number of directions. In a case that more than one cell neighborhood is used, each subsequent cell neighborhood is defined so that it excludes cells belonging to a previously-searched cell neighborhood. A subsequent neighborhood corresponds to a geographic area that is a distance from the initial point greater than the distance associated with a previously-searched neighborhood.

7 Claims, 6 Drawing Sheets

U.S. PATENT DOCUMENTS

Figure 1:
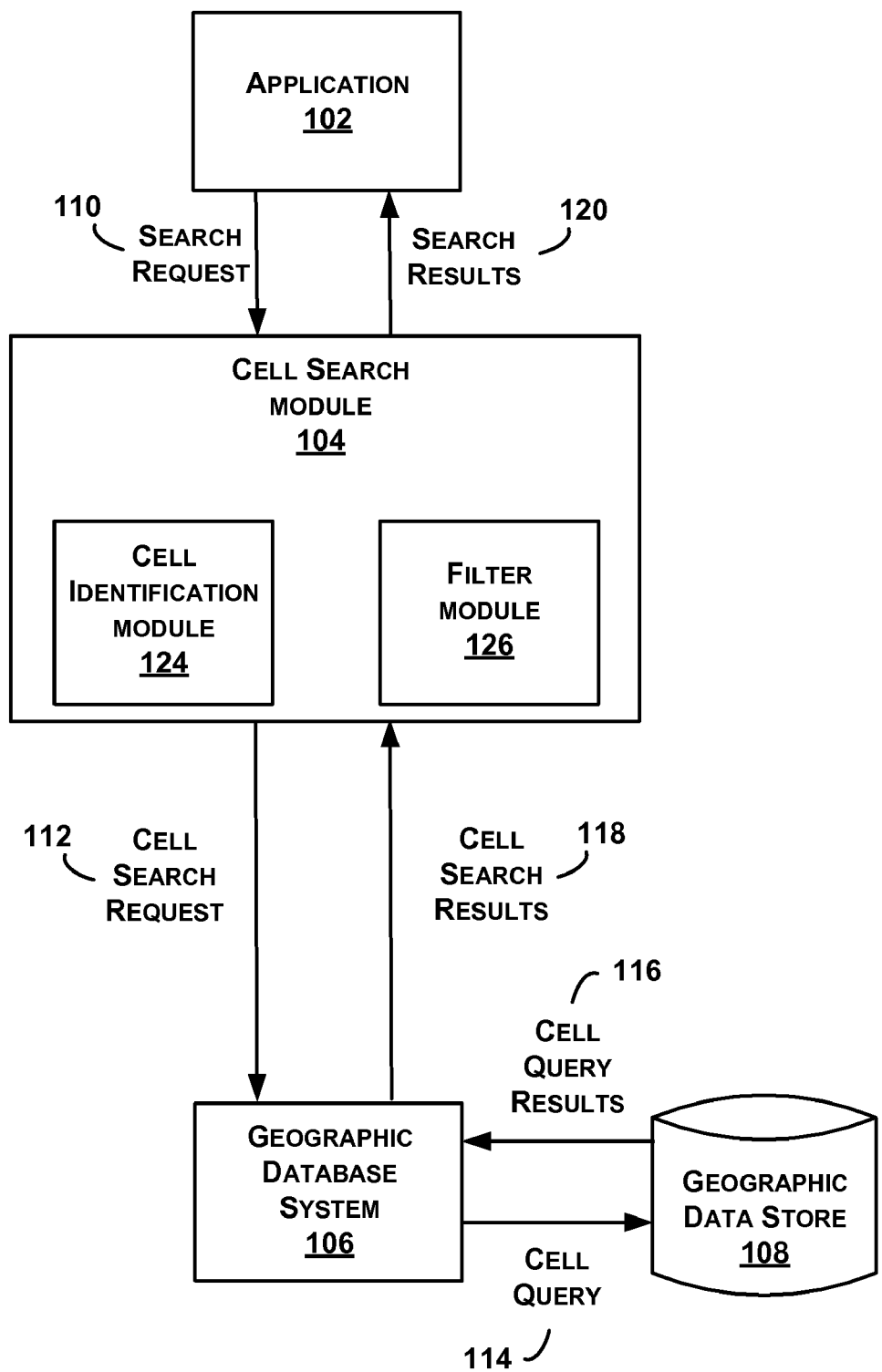

| | | | |
|---|---|---|---|
| 6,148,261 A | 11/2000 | Obradovich et al. | |
| 6,151,552 A | 11/2000 | Koizumi et al. | |
| 6,154,699 A | 11/2000 | Williams | |
| 6,163,269 A | 12/2000 | Millington et al. | |
| 6,172,641 B1 | 1/2001 | Millington | |
| 6,175,801 B1 | 1/2001 | Millington | |
| 6,177,943 B1 | 1/2001 | Margolin | |
| 6,178,380 B1 | 1/2001 | Millington | |
| 6,184,823 B1 * | 2/2001 | Smith et al. | 342/357.13 |
| 6,189,130 B1 | 2/2001 | Gofman et al. | |
| 6,201,540 B1 | 3/2001 | Gallup et al. | |
| 6,204,778 B1 | 3/2001 | Bergan et al. | |
| 6,205,397 B1 | 3/2001 | Eslambolchi et al. | |
| 6,212,474 B1 | 4/2001 | Fowler et al. | |
| 6,223,118 B1 | 4/2001 | Kobayashi et al. | |
| 6,229,546 B1 | 5/2001 | Lancaster et al. | |
| 6,249,740 B1 | 6/2001 | Ito et al. | |
| 6,253,151 B1 | 6/2001 | Ohler et al. | |
| 6,256,029 B1 | 7/2001 | Millington | |
| 6,278,942 B1 | 8/2001 | McDonough | |
| 6,308,134 B1 | 10/2001 | Croyle et al. | |
| 6,320,517 B1 | 11/2001 | Yano et al. | |
| 6,321,158 B1 * | 11/2001 | DeLorme et al. | 701/201 |
| 6,349,257 B1 | 2/2002 | Liu et al. | |
| 6,356,210 B1 | 3/2002 | Ellis | |
| 6,360,167 B1 | 3/2002 | Millington et al. | |
| 6,362,751 B1 | 3/2002 | Upparapalli | |
| 6,363,322 B1 | 3/2002 | Millington | |
| 6,370,475 B1 | 4/2002 | Breed et al. | |
| 6,377,278 B1 | 4/2002 | Curtright et al. | |
| 6,381,536 B1 | 4/2002 | Satoh et al. | |
| 6,385,535 B2 | 5/2002 | Ohishi et al. | |
| 6,385,542 B1 | 5/2002 | Millington | |
| 6,397,145 B1 | 5/2002 | Millington | |
| 6,405,130 B1 | 6/2002 | Piwowarski | |
| 6,408,243 B1 | 6/2002 | Yofu | |
| 6,427,115 B1 | 7/2002 | Sekiyama | |
| 6,430,501 B1 | 8/2002 | Slominski | |
| 6,453,235 B1 | 9/2002 | Endo et al. | |
| 6,484,089 B1 | 11/2002 | Millington | |
| 6,487,494 B2 | 11/2002 | Odinak et al. | |
| 6,515,595 B1 | 2/2003 | Obradovich et al. | |
| 6,529,822 B1 | 3/2003 | Millington et al. | |
| 6,529,824 B1 | 3/2003 | Obradovich et al. | |
| 6,539,301 B1 | 3/2003 | Shirk | |
| 6,542,814 B2 * | 4/2003 | Polidi et al. | 701/208 |
| 6,565,610 B1 | 5/2003 | Wang et al. | |
| 6,574,551 B1 | 6/2003 | Maxwell et al. | |
| 6,609,062 B2 * | 8/2003 | Hancock | 701/200 |
| 6,631,322 B1 | 10/2003 | Arthur et al. | |
| 6,662,105 B1 | 12/2003 | Tada et al. | |
| 6,671,617 B2 | 12/2003 | Odinak et al. | |
| 6,704,649 B2 | 3/2004 | Miyahara | |
| 6,728,608 B2 | 4/2004 | Ollis et al. | |
| 6,728,636 B2 | 4/2004 | Kokojima et al. | |
| 6,748,323 B2 | 6/2004 | Lokshin et al. | |
| 6,765,554 B2 | 7/2004 | Millington | |
| 6,774,932 B1 | 8/2004 | Ewing | |
| 6,782,319 B1 * | 8/2004 | McDonough | 701/208 |
| 6,816,596 B1 | 11/2004 | Peinado et al. | |
| 6,819,301 B2 | 11/2004 | Nagamatsu et al. | |
| 6,842,695 B1 | 1/2005 | Tu | |
| 6,873,907 B1 | 3/2005 | Millington et al. | |
| 6,885,874 B2 | 4/2005 | Grube et al. | |
| 6,917,982 B1 | 7/2005 | Dueck et al. | |
| 6,938,028 B1 | 8/2005 | Ito | |
| 7,031,834 B2 | 4/2006 | Ito et al. | |
| 7,031,836 B2 | 4/2006 | Branch | |
| 7,058,504 B2 | 6/2006 | McDonough | |
| 7,170,518 B1 | 1/2007 | Millington et al. | |
| 7,233,860 B2 | 6/2007 | Lokshin et al. | |
| 7,260,475 B2 | 8/2007 | Suzuki | |
| 7,321,826 B2 * | 1/2008 | Sheha et al. | 701/209 |
| 7,333,820 B2 | 2/2008 | Sheha et al. | |
| 7,343,242 B2 | 3/2008 | Breitenberger et al. | |
| 7,353,107 B2 | 4/2008 | Breitenberger et al. | |
| 7,379,812 B2 | 5/2008 | Yoshioka et al. | |
| 7,421,334 B2 | 9/2008 | Dahlgren | |
| 7,512,487 B1 | 3/2009 | Golding et al. | |
| 7,546,202 B2 * | 6/2009 | Oh | 701/200 |
| 7,590,490 B2 | 9/2009 | Clark | |
| 2001/0018628 A1 | 8/2001 | Jenkins et al. | |
| 2002/0151315 A1 * | 10/2002 | Hendrey | 455/466 |
| 2003/0036842 A1 * | 2/2003 | Hancock | 701/200 |
| 2003/0036848 A1 * | 2/2003 | Sheha et al. | 701/209 |
| 2003/0167120 A1 * | 9/2003 | Kawasaki | 701/209 |
| 2003/0182052 A1 * | 9/2003 | DeLorme et al. | 701/201 |
| 2003/0191578 A1 * | 10/2003 | Paulauskas et al. | 701/200 |
| 2004/0049337 A1 | 3/2004 | Knockeart et al. | |
| 2004/0204821 A1 * | 10/2004 | Tu | 701/200 |
| 2004/0208350 A1 * | 10/2004 | Rea et al. | 382/128 |
| 2004/0254723 A1 * | 12/2004 | Tu | 701/209 |
| 2005/0107948 A1 * | 5/2005 | Catalinotto | 701/208 |
| 2006/0080031 A1 | 4/2006 | Cooper et al. | |
| 2006/0089788 A1 * | 4/2006 | Laverty | 701/202 |
| 2006/0106534 A1 | 5/2006 | Kawamata et al. | |
| 2006/0212217 A1 * | 9/2006 | Sheha et al. | 701/209 |
| 2006/0265422 A1 * | 11/2006 | Ando et al. | 707/104.1 |
| 2007/0027628 A1 * | 2/2007 | Geelen | 701/213 |
| 2007/0073480 A1 | 3/2007 | Singh | |
| 2007/0088494 A1 | 4/2007 | Rothman et al. | |
| 2007/0130153 A1 * | 6/2007 | Nachman et al. | 707/10 |
| 2007/0204218 A1 | 8/2007 | Weber et al. | |
| 2007/0213929 A1 | 9/2007 | Tanizaki et al. | |
| 2007/0233384 A1 * | 10/2007 | Lee | 701/213 |
| 2008/0076451 A1 * | 3/2008 | Sheha et al. | 455/456.3 |
| 2008/0125958 A1 | 5/2008 | Boss et al. | |
| 2008/0133120 A1 | 6/2008 | Romanick | |
| 2008/0134088 A1 * | 6/2008 | Tse et al. | 715/810 |
| 2008/0177470 A1 | 7/2008 | Sutardja | |
| 2008/0270016 A1 | 10/2008 | Proietty et al. | |
| 2009/0138190 A1 | 5/2009 | Kulik | |
| 2009/0150064 A1 * | 6/2009 | Geelen | 701/201 |
| 2009/0171584 A1 | 7/2009 | Liu | |
| 2009/0182498 A1 | 7/2009 | Seymour | |
| 2009/0182500 A1 | 7/2009 | Dicke | |
| 2009/0187340 A1 | 7/2009 | Vavrus | |
| 2009/0187341 A1 | 7/2009 | Vavrus | |
| 2009/0187342 A1 | 7/2009 | Vavrus et al. | |

FOREIGN PATENT DOCUMENTS

| | | |
|---|---|---|
| JP | 2001194172 | 7/2001 |
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20010088887 | 9/2001 |
| KR | 20020018134 | 3/2002 |
| KR | 20020084716 | 11/2002 |
| KR | 20040037651 | 5/2004 |
| KR | 20040106688 | 12/2004 |
| KR | 20070080726 | 8/2007 |

OTHER PUBLICATIONS

International Patent Application No. PCT/US2008/084659, Written Opinion and International Search Report, Apr. 28, 2009.

International Patent Application No. PCT/US2009/030177, Writtten Opinion and International Search Report, Apr. 29, 2009.

International Patent Application No. PCT/US2009/030314, Written Opinion and International Search Report, May 25, 2009.
International Patent Application Serial No. PCT/US2009/030176, Written Opinion and International Search Report, mailed Sep. 1, 2009.
Shamir, Adi et al., "Playing 'Hide and Seek' with Stored Keys," Lecture Notes in Computer Science, vol. 1648, 1999, pp. 118-124.
International Application No. PCT/US09/30322, International Search Report and Written Opinion, Aug. 31, 2009.
International Patent Application Serial No. PCT/US2009/030176, Written Opinion and International Search Report, mailed Sep. 1, 2009.

* cited by examiner

|  | 1st | 2nd | 3rd | 4th | 5th | 6th | 7th | 8th |
|---|---|---|---|---|---|---|---|---|
| First Row | X | X | X | X | > | -- | -- | -- |
| Second Row | < | < | < | X | X | X | > | -- |
| Third Row | -- | -- | -- | < | < | X | X | > |

"X" : DISTANCE CALCULATED, CELL BELONGS TO CURRENT RING;

"<" : DISTANCE CALCULATED, CELL BELONGS TO THE PREVIOUS RING;

">" : DISTANCE CALCULATED, CELL DOES NOT BELONG TO CURRENT OR PREVIOUS RING;

"--" : DISTANCE NOT CALCULATED.

FIGURE 7

|  | 4 : 11 | 4 : 10 | 4 : 1 | 4 : 2 |  |
|---|---|---|---|---|---|
|  | 4 : 12 | 3 : 6 | 3 : 1 | 3 : 2 | 4 : 3 |
| 4 : 13 | 3 : 7 | 2 : 2 | 1 : 1 | 3 : 3 | 4 : 4 |
| 4 : 16 | 3 : 10 | 3 : 9 | 2 : 1 | 3 : 5 | 4 : 9 |
|  | 4 : 15 | 3 : 8 | 3 : 4 | 4 : 7 | 4 : 8 |
|  |  | 4 : 14 | 4 : 5 | 4 : 6 |  |

FIGURE 8

NEAREST-NEIGHBOR GEOGRAPHIC SEARCH

FIELD OF THE INVENTION

The present disclosure pertains to searching a geographic database, and more particularly to using a grid of cells to identify bounds of a search of the geographic database, with certain of the cells identified as cells nearest to a central point of the search.

BACKGROUND

Geographic databases exist, which identify geographic, or mapping, information coupled with geographic objects, such as points of interest (POIs), each of is identified in the geographic database using associated information including geographic location information and other attribute information. Other information that may be stored for a POI includes, but is not limited to, name, POI type (e.g., city hall, police station, gas station, park, restaurant, etc.) More and more, people are relying on a geographic database, and are using applications that access a geographic database, to locate a POI based on the geographic information associated with the POI. Such applications include navigation systems used in telephones and other handheld devices, desktop computer applications, in automobiles and other vehicles, to name just a few.

Typically, an application requests information from a geographic database, such as POIs and information associated with POIs, based on some criteria specified by the application itself or a user. The criteria is used to query the database, retrieve a set of search results, e.g., POIs, that satisfy the criteria, and in some cases filter the search results before they are returned to the application. A request for information typically identifies at least an initial geographic location and some information to limit the search, such as a distance from the initial geographic location.

The information provided by an application typically identifies a central location for the search and a distance from the central location, which information can be used to define an area for the search. In a conventional approach, the center point and distance are used to define a search area, with the distance typically being used to identify a radius, $r_1$, of the circular area. If the first search fails to yield the desired results, a second search expands the area using a second radius, $r_2$, which is larger than $r_1$, and the original center point. However, the second search includes the area of the first search, which results most if not all of the first search area being included in the search area for the second search.

SUMMARY

The present disclosure seeks to address failings in the art and to provide a search using a set of cells, or neighbor cells, comprising one or more cells nearest to a center point of the search. Embodiments of the present disclosure use an incremental approach, such that a subsequent search uses another set of cells, which excludes previous-searched cells.

Disclosed herein is a method and apparatus for use in searching a geographic database to retrieve geographic objects one cell from a neighborhood of cells at a time. A cell neighborhood can be defined using a grid of cells and an initial, or center, point. A first neighborhood is identified based on its proximity to the initial search point, and corresponds to a first geographic area defined using the initial point and a distance from the initial search point in a number of directions. In a case that more than one cell neighborhood is used, each subsequent cell neighborhood is defined so that it excludes cells belonging to a previously-searched cell neighborhood. A subsequent neighborhood corresponds to a geographic area that is a distance from the initial point greater than the distance associated with a previously-searched neighborhood.

In at least one embodiment, a method for accessing information from a geographic database comprises receiving a search request, the search request identifying search criteria including an initial position, identifying, using the initial position, a neighborhood of cells from a grid of cells associated with a geographic database, and searching the geographic database one cell at a time from the neighborhood to retrieve a number points of interest (POIs) from a plurality of POIs identified in a geographic database, each POI retrieved having a corresponding location determined to be in a cell of the neighborhood.

In accordance with at least one embodiment, a new neighborhood of cells is identified from the grid of cells, the new neighborhood of cells comprising cells other than the cells in a previous neighborhood of cells. The geographic database is searched one cell at a time from the new neighborhood to retrieve a number of POIs of said plurality, each POI retrieved having a corresponding location determined to be in a cell of said new neighborhood.

DRAWINGS

The above-mentioned features and objects of the present disclosure will become more apparent with reference to the following description taken in conjunction with the accompanying drawings wherein like reference numerals denote like elements and in which:

FIG. 1 provides an exemplary block diagram illustrating components of a system for use in accordance with one or more embodiments of the present disclosure.

Figure 2:
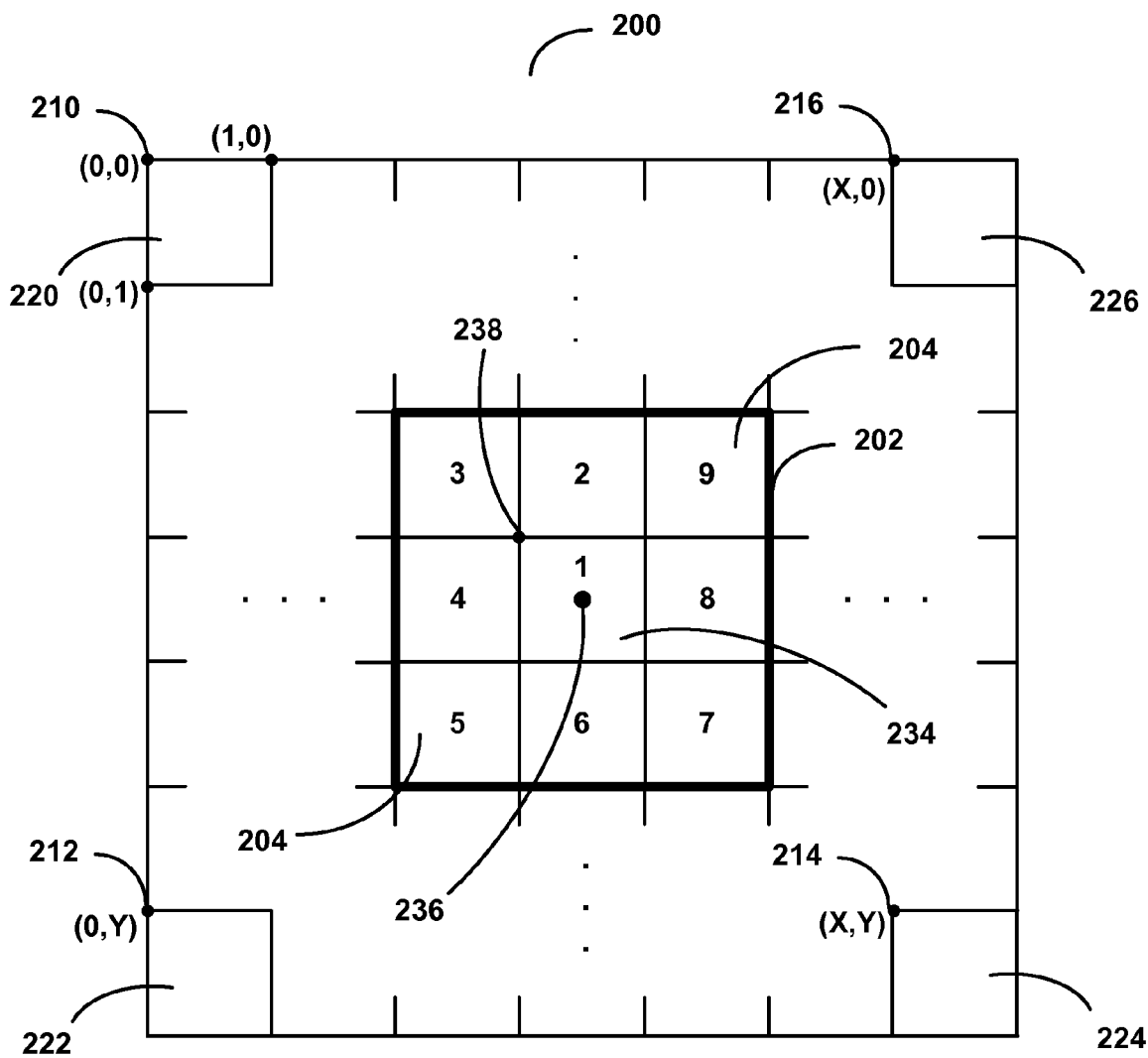

FIG. 2 provides an illustrative example of a neighborhood of cells for use in accordance with one or more embodiments of the present disclosure.

Figure 3:
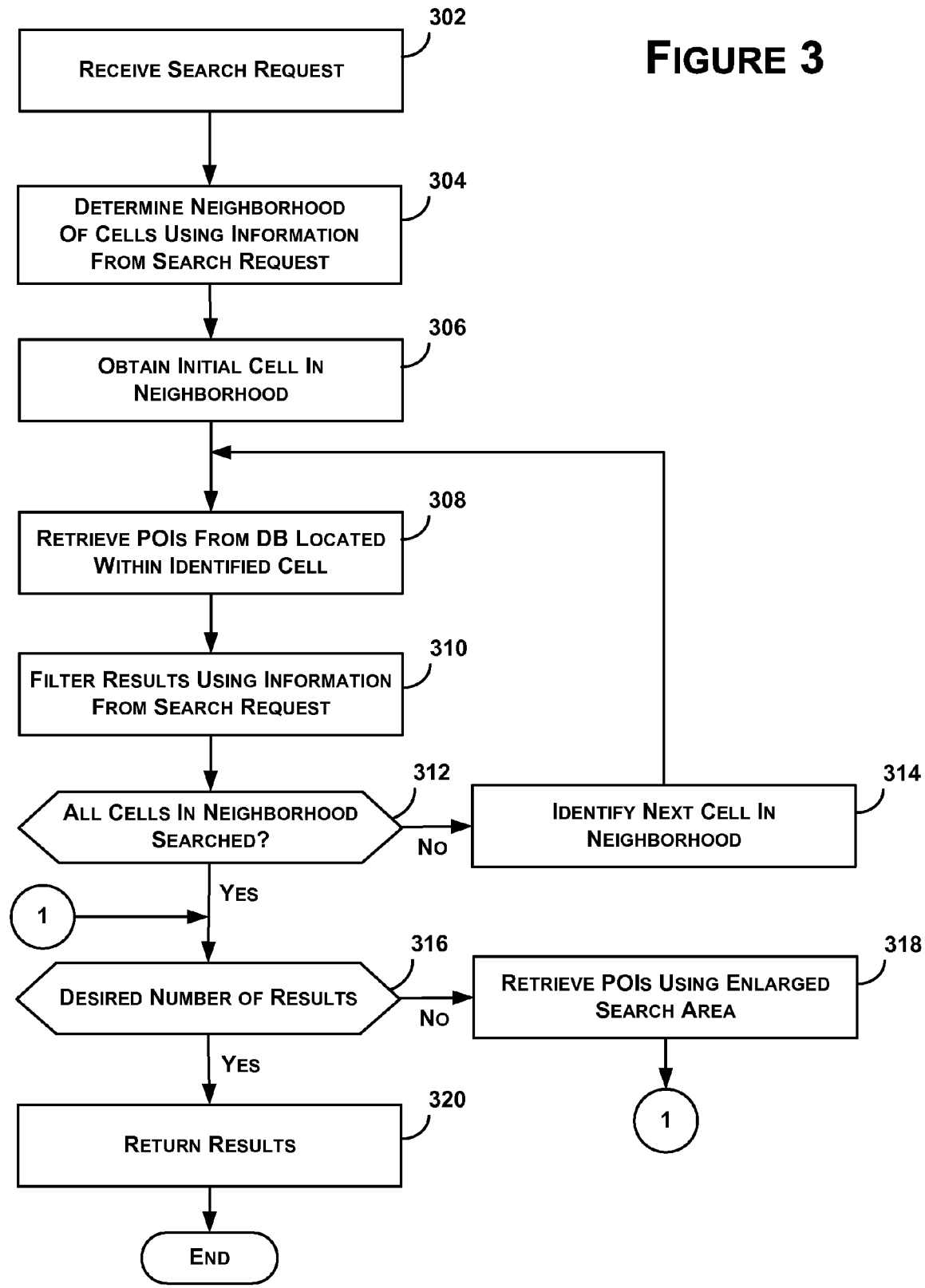

FIG. 3 provides an example of a flow of process steps for searching using a neighborhood of cells in accordance with one or more embodiments of the present disclosure.

Figure 4:
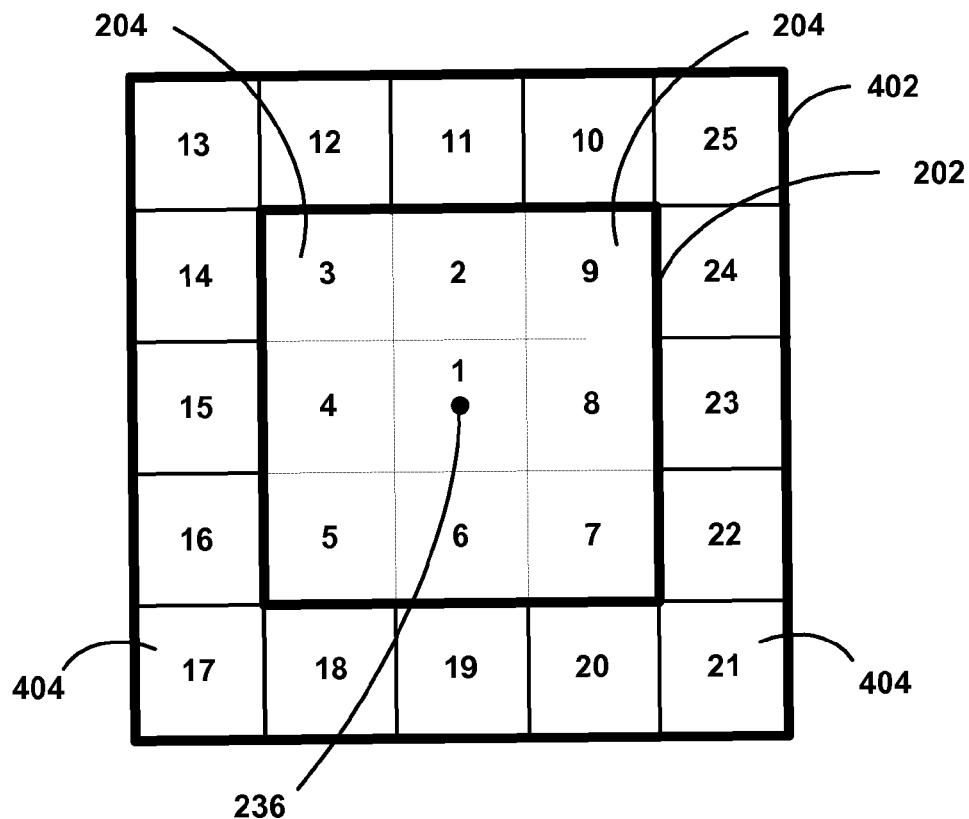

FIG. 4 provides an example of a search involving two cell neighborhoods in accordance with one or more embodiments of the present disclosure.

Figure 5:
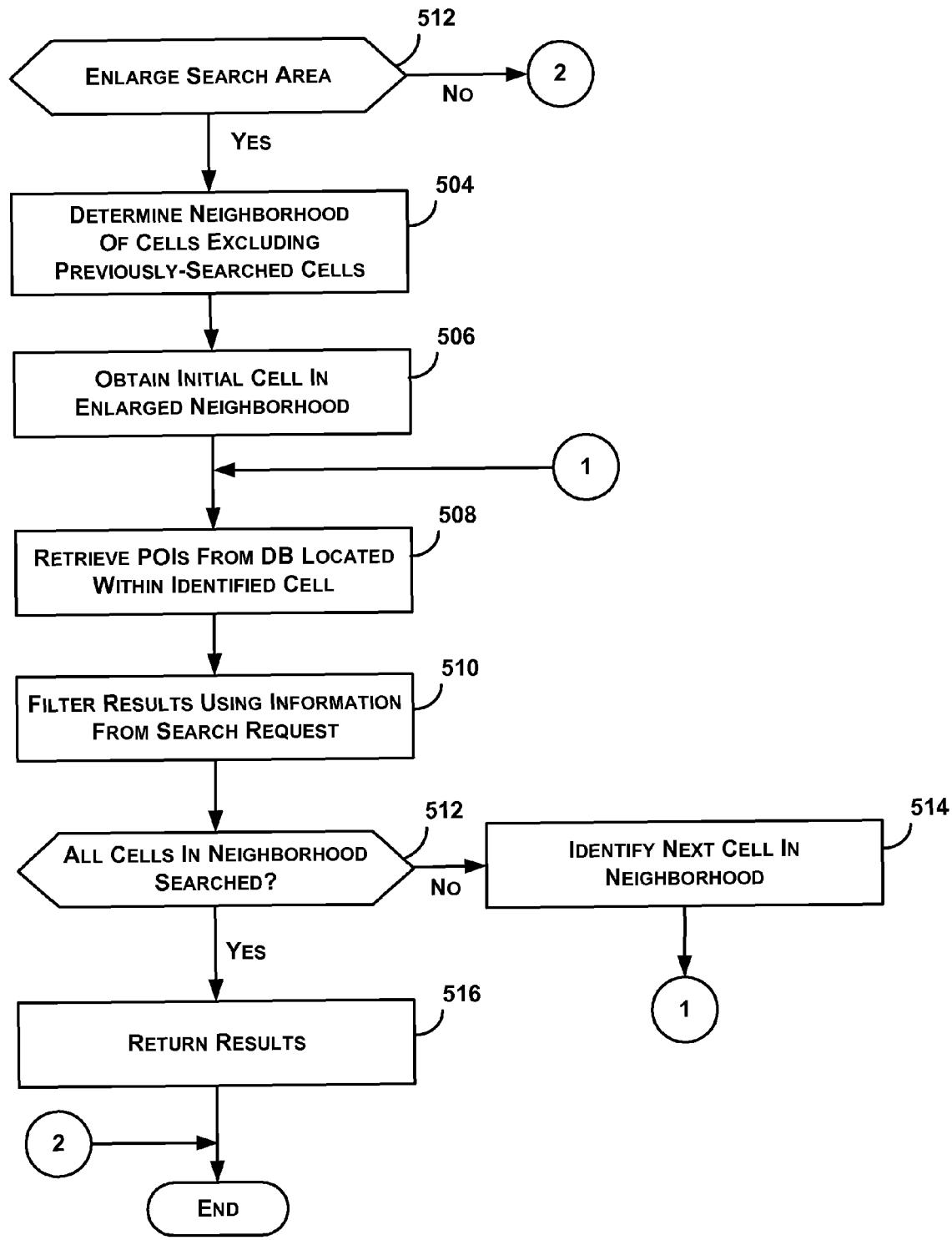

FIG. 5 provides an example of a flow of process steps for enlarging a search area in accordance with one or more embodiments of the present disclosure.

Figure 6:
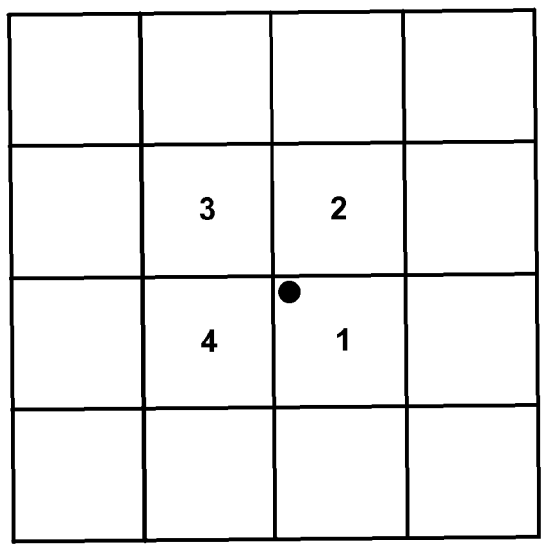

FIG. 6 provides an example illustrating another example of a neighborhood of cells identified in accordance with one or more embodiments of the present disclosure.

FIG. 7 provides an example using at least one cell from a previous row to identify cells in a subsequent row as part of a current ring in accordance with one or more embodiments of the present disclosure.

FIG. 8 provides an example of rings and cells contained in a given ring used in a spiral search in accordance with one or more embodiments of the present disclosure.

DETAILED DESCRIPTION

In general, the present disclosure includes a geographic database search using neighboring cells, and system, method and architecture thereof.

Certain embodiments of the present disclosure will now be discussed with reference to the aforementioned figures, wherein like reference numerals refer to like components.

FIG. 1 provides an exemplary block diagram illustrating components of a system for use in accordance with one or more embodiments of the present disclosure. In accordance with one or more such embodiments, a cell search module (CSM) 104 receives a search request 110 from an application 102. The application 102 can be any application that wishes to access geographic information from a geographic data store, such as geographic data store 108, which stores geographic information. By way of some non-limiting examples, application 102 can be a navigation system, directory listing (e.g., business and/or residential listing), mapping, and/or geographic search application. By way of further non-limiting examples, application 102 can be used with a handheld device, a desktop computer, a server computer, a computing system coupled to a vehicle, etc.

Geographic data store 108 comprises geographic information and identifies one or more geographic objects, e.g., points of interest (POIs). A geographic objects, such as a POI, is an item, e.g., a discrete item, in the geographic data store 108, which has at least one corresponding geographic location, and none or more other attributes. A POI's geographic location can be identified using latitude and longitude coordinate data in a latitudinal/longitudinal coordinate system, such as a global positioning system (GPS). Other attribute information can include, without limitation, descriptive information, such as a name, telephone number, type or category (e.g., business, residence, park, street, city, state, etc.), subtype/subcategory (e.g., restaurant, grocery store, gas station, etc.), address, hours of operation, etc.

In accordance with one or more embodiments of the present disclosure, in response to a received search request 110, CSM 104 accesses geographic database system 106 one cell at a time to retrieve geographic information from geographic data store 108. It should be apparent that geographic database system 106 can be any database management system (DBMS), or other system used to access, e.g., store and retrieve, data in geographic data store 108. Data store 108 can be any type of store, include database files, flat files, etc. stored in a some type of memory.

A cell can be any geometric shape, such as a square, rectangle, triangle, etc., and is defined by some set of boundaries or boundary lines, and is typically a closed shape. The geometric shape of the cell identifies the cell's boundary and borders. A cell can have a defined location relative to the geography and coordinate system of the geographic database 106, and/or geographic data store 108. A cell's location can be identified using latitude and longitude coordinate information in accordance with the coordinate system used with the stored geographic objects stored in geographic data store 108, for example. By way of a further non-limiting example, a cell's latitude and longitude coordinate information can correspond to a point on the cell's border (e.g., a vertex of the cell's geometric shape, such as the corner of a rectangle, or other point along the cell's border) or somewhere (e.g., a center point or other point) inside the cell. Other information, such as the cell's distance from a search center point, the cells dimensions, etc. can be identified for a given cell. Dimension information associated with the cell can be used to determine the cell's boundaries and/or area. In the case of a square, for example, a cell's dimension can comprise a length and width, which can be used to identify the cell's boundary and/or area. In accordance with one or more embodiments, coordinate and dimension information associated with a cell can be used to position the cell within a geographic coordinate system associated with a geographic area and to define the portion of the geographic area that is coincident with the cell.

In accordance with one or more embodiments, CSM 104 issues a cell search request 112 to geographic database system 106 to search geographic data store 108 for information corresponding to a geographic area. The geographic area can comprise the area of one or more cells. In response, geographic database system 106 issues a query 114 to search geographic data store 108. In accordance with one or more such embodiments, the geographic data store 108 is searched one cell at a time. A set of results retrieved from geographic data store 108 for a given cell are returned to geographic database system 106. By way of a non-limiting example, the cell query results 116 comprise some number of POIs, each of which has a corresponding location determined to be in the cell. In such a case, for example, the POIs returned as part of the cell query results 116 are those POIs that are determined to have a corresponding location, e.g., based on latitude and longitude coordinate information of the POI, "within" a current cell searched. The POI's location can be "within" the boundaries of the current cell if it is determined to be located within the area of the current cell, and may be "within" the cell's boundaries if the POI is located on the border of the current cell, for example. Geographic database system 106 returns cell search results 118 to the CSM 104.

In accordance with one or more embodiments and as shown in the example of FIG. 1, CSM 104 can comprise a cell identification module (CIM) 124 and a filter module 126. CIM 124 can be configured to identify a cell as the current cell to be used in a query issued by CSM 104 to the geographic database system 106. In accordance with one or more embodiments, an initial query involves using an initial cell as the current cell. The initial cell can be identified using an initial point, or location, specified by application 102 in search request 110. By way of a non-limiting example, the initial point can be a current position (e.g., identified by GPS coordinates) of a user of application 102, or some other location specified by the user or the application 102. It should be apparent to one or ordinary skill that an initial point can be specifically identified, or can be derived by CSM 104, based on information supplied to CSM 104.

In response to the cell search request 112, geographic database 106 generates cell search results 118, which are output to CSM 104, in accordance with one or more embodiments. Filter 126 can be used to filter the cell search results 118. Filter 126 can be any type of filter, and can include a filter based on criteria specified in search request 110, for example. Filtered or unfiltered search results are then forwarded as search results 120 to application 102.

In the example shown in FIG. 1, CIM 124 is a part, or component, of CSM 104. Alternatively, some or all of CIM 124 can be a part of geographic database 106. In such a case, geographic database 106 can be configured to identify the current cell, e.g., an initial or subsequent cell, for a given search. Furthermore and while the filter module 126 is shown to be a part of CSM 126, some or all of the filter module 126 can be a part of the geographic database 106. As yet another alternative, some or all of CSM 104 can be a part of a database management system of which geographic database 106 is a part, and/or CSM 104 can be a part of application 102. Further still, application 102, CSM 104 and geographic database 106 can be one, integrated component.

In accordance with at least one embodiment of the present disclosure, CSM 104 queries geographic database 106 one cell at a time for a set of cells, referred to herein as a neighborhood of cells, and returns search results 120 compiled from the cell searches to application 102. As is discussed herein, a neighborhood of cells can be a collection of cells, e.g., a collection of adjacent cells. FIG. 2 provides an illustrative example of a neighborhood of cells for use in accordance with one or more embodiments of the present disclosure. In accordance with such embodiments, a grid of cells 200 is provided, which can be a static or dynamic cell grid. As with an individual cell, the cell grid 200 can be defined relative to the geography and coordinate system used to specify the location of geographic objects, e.g., POIs, stored in the geographic data store 108. Each cell in the cell grid 200 has at least one set of coordinates and at least one dimension. For example, one set of coordinates can be relative to cell grid 200, and another set of coordinates can be relative to the geography and coordinate system used to define a location in the geographic data store 108, e.g., GPS coordinate system. Of course, it should be apparent that any number of sets of coordinates, and coordinate systems, can be used with embodiments of the present disclosure.

FIG. 2 illustrates one example of a cell grid coordinate system. Examples used herein assume a two-dimensional coordinate system and cell grid. It should be apparent that any number of dimensions can be used with embodiments of the present disclosure. In the example shown in FIG. 2, the upper left hand cell, cell 220, can be considered the origin cell, and the upper left hand point 210 of cell 220 can be considered to be the origin point 210 of cell 220 as well as cell grid 200. In the example of FIG. 2, the grid cell 200 coordinate values can be expressed as x- and y-coordinate values, such that the x- and y-coordinate values of the origin point 210 are (0,0), which coordinate values are also the coordinate values of the origin point of the cell grid 200. In addition, origin point 210 can have associated coordinate values of the geographic coordinate system, e.g., latitudinal and longitudinal coordinate values. Since origin point 210 is also the origin point of cell grid 200, these same geographic coordinate system coordinates are the geographic coordinates of the origin point of cell grid 200.

It is possible to derive the coordinates of any cell in cell grid 200. For example, the cell in the grid 200 that is to the immediate right of cell 220 has x- and y-coordinate values of (1,0). Similarly, and assuming X number of cells in the X direction and Y number of cells in the Y direction, cells 222, 224 and 216 located at the other corners of cell grid 220 have x- and y-coordinate values of (0,Y), (X,Y) and (X,0) as their respective origin points 212, 214 and 216. In addition, origin points 212, 214 and 216 can have geographic coordinate values as well, which coordinate values can be predetermined or dynamically determined, e.g., based on whether the position of the cell grid 200 is static or dynamic. An origin point's geographic coordinate values can be dynamically determined, for example, using the geographic coordinate values of another cell and the known dimensions of each cell, e.g., a known distance between origin points of the two cells.

In the example shown in FIG. 2, every cell in the grid cell 200 is a square, with the same height and width. It should be apparent that other geometric shapes can be used. In addition, it should be apparent that cell size need not be uniform across all of the cells in cell grid 200.

Point 236 of cell 234 represents an initial, or a center, point of a search. While point 236 is shown as the center of cell grid 200 and the center of cell 234, it need not be. Point 236 corresponds to a center point of a search, which can be determined based on the information provided in a search request, e.g., search request 110. In accordance with one or more embodiments, grid cell 200 can be stationary or it can be dynamically positioned over point 236. Cell 234 can be identified using the center point as an initial cell for a search, e.g., cell 234 can be identified as the cell that contains point 236.

In accordance with one or more embodiments, a set of cells from cell grid 200 forms a neighborhood of cells, the cells of which can be defined based on each cell's position relative to initial cell 234. In the example of FIG. 2, the cells within the box 202 comprise a cell neighborhood 202, with cell 234, which contains initial point 236, as the initial cell. Like cell 220 of the cell grid 200, and the other cells in the cell grid, cell 234 has at least one point, such as the upper left hand point 238, which can have one or more sets of coordinates.

In accordance with one or more embodiments of the present disclosure, a search is performed one cell at a time starting with an initial one of cells 204, which in the example of FIG. 2 is cell 234, and then iterating through the cells 204 in neighborhood 202, performing a query 114 of geographic data store 108 for each of the cells. The numbers associated with the cells in the neighborhood 202 do not necessarily correspond to the order in which the cells are searched. The order in which the cells are searched can be random. For example, after cell 1 is searched, cell 7 can be searched, and then cell 3, and so on. The order in which the cells are searched can be based on a location of initial point 236 relative to the cells in cell neighborhood 202. For example, assume that initial point 236 is closest to cell 4 and then cell 3. In such a case, cell 1, as the initial cell, can be searched first, followed by cell 4, and then cell 3.

By way of another non-limiting example, an order in which the cells are searched can be based on an expectation that one cell may yield more POIs than another cell. For example, assume that cell 5 is expected to yield more POIs than cell 1. It is possible that cell 5 might be searched first even though the initial position is located in cell 1. This might be even more useful in a case that the initial point 236 is located closer to the shared border between cells 1 and 5 than shown, for example.

In accordance with one or more embodiments, a search is performed incrementally, and iteratively, with respect to the cells searched in a cell neighborhood and with respect to the cell neighborhoods searched. In accordance with one or more such embodiments, all of the cells 204 in cell neighborhood 202 are searched before search results 120 are returned to application 102. In such embodiments, a query 114 can be performed for a cell 204, and the query results 116 can be filtered by filtering module 126. The process is repeated for the next cell 204 in cell neighborhood 202. After the cells 204 in cell neighborhood 202 are searched and the results of each cell searched are filtered, the filtered search results are compiled for all of the cells searched in the cell neighborhood 202. It should be apparent that techniques such as parallel processing techniques can be used to optimize searching.

In accordance with one or more embodiments, the search results compiled for cell neighborhood 202 comprise a first increment of search results 120, which can be returned to application 102 at a point, e.g., after all of the cells 204 in cell neighborhood 202 have been searched. Application 102 can elect to continue the search, e.g., in effect, to widen the search area. Alternatively, CSM 104 can elect to widen the search area prior to returning the search results 120 compiled for cell neighborhood 202 to application 102. Under either alternative, embodiments of the present disclosure provide an ability to expand the geographic area to be searched, without searching areas previously searched, e.g., the widened search can be performed by searching cells other than the ones previously searched.

FIG. 4 provides an example of a search involving two cell neighborhoods in accordance with one or more embodiments of the present disclosure. Cell neighborhood 202 from FIG. 2 is shown in FIG. 4. As previously described, the cells 204 in cell neighborhood 202 are searched, and search results for cell neighborhood 202 are compiled. Another neighborhood of cells 402 comprises cells 404, e.g., cells numbers 10 through 25. The cells 404 in cell neighborhood 402 can be searched to widen the area searched. The search results compiled from a search of cells 404 of neighborhood 402 can be used to supplement the search results compiled from searching cells 204 in cell neighborhood 202.

CIM 124 of CSM 104 can be used to identify the cells 202 of neighborhood 202 based on the initial point 236, and to identify the order in which the cells 202 of neighborhood 202 are searched. In a case that cell neighborhood 402 is to be searched subsequent to cell neighborhood 202, CIM 124 can identify cells 404 of neighborhood 402, and the order in which the cells 404 are searched. In identifying the cells 404 of cell neighborhood 402, CIM 124 can be used to identify cells 204 of cell neighborhood 202, such that the search conducted for cell neighborhood 402 does not include the cells 204 of cell neighborhood 202. In so doing, a search area can be expanded, e.g., to obtain additional search results, without repeating a search of cells identified as belonging to a previously-searched area.

FIG. 6 provides an example illustrating another example of a neighborhood of cells identified in accordance with one or more embodiments of the present disclosure. The cells in the cell neighborhood are numbered 1 through 4. In the example of FIG. 6, the initial point is located close to the intersection of cells 1 through 4. In accordance with one or more embodiments, CIM 124 can use the location of the initial point to identify the neighborhood of cells. In the example shown, the neighborhood is identified to be cells 1 through 4. Of course, an expanded search can be performed using cells other than those initially identified.

FIG. 3 provides an example of a flow of process steps for searching using a neighborhood of cells in accordance with one or more embodiments of the present disclosure. The steps can be performed by CSM 104, for example. At step 302, a search request, e.g., search request 110, is received by CSM 104. At step 304, CIM 124 of CSM 104 can be used to determine a neighborhood of cells using information from the received search request. An initial cell from the identified neighborhood of cells is obtained at step 306. At step 308, geographic objects, e.g., POIs, are retrieved from the geographic data store 108. The retrieved POIs have a corresponding location determined to be within the current cell being searched.

At step 310, the search results are filtered, e.g., using filtering module 126 of CSM 104. The filtering process can use search criteria specified in search request 110. One example of a filter that can be performed is one based on a distance, or area of the search, determined using information contained in search request 110. By way of a further non-limiting example, the filtering can be based on a name, category and/or subcategory of the attributes of the POIs retrieved for the searched cell.

At step 312, a determination is made whether or not all of the cells in the cell neighborhood have been searched. If not, processing proceeds to step 314 to identify the next cell in the neighborhood. If it is determined that all of the cells in the neighborhood have been searched, processing continues at step 316, to make a determination whether or not a desired number of results have been retrieved. If so, processing continues at step 320 to return the results. If additional searching is indicated in step 316, processing continues at step 318 to enlarge the search area and to perform a search, e.g., using steps 306, 308, 310 and 314, for example. As is described herein in accordance with one or more embodiments, the enlarged search area excludes previously-searched areas.

Once the new, enlarged search area has been searched, a determination can be made at step 316 whether or not a desired number of search results have been retrieved. If not, processing can continue at step 318 to enlarge the search area even more.

When a determination is made at step 316 that a desired number of results have been retrieved, processing continues at step 320 to return the results to the application 102. If multiple neighborhoods are searched, the search results compiled for each neighborhood can be aggregated and returned to the application 102.

In the example shown in FIG. 3, the determination to enlarge the search is performed by CSM 104. Alternatively, the determination can be made by application 102. In such a case, the results from searching a neighborhood of cells can be returned to application 102, so that application 102 can make a determination, e.g., based on the results returned, whether or not to enlarge the search area.

In the example shown in FIG. 3, the determination at step 316 is performed after all of the cells in the neighborhood have been searched. As an alternative, the determination at step 316 can be made after less than all of the cells in the neighborhood have been searched. Since the search area is divided into cells of a cell neighborhood, the search can be enlarged by searching the remaining cells in the neighborhood without searching the previously-searched cells.

FIG. 5 provides an example of a flow of process steps for enlarging a search area in accordance with one or more embodiments of the present disclosure. At step 512, a determination is made whether to enlarge the search area. As previously described, the search area can be enlarged based on an instruction from the application 102 or CSM 104, for example. If there is no need to enlarge the search area, processing ends.

If it is determined that the search area is to be enlarged, processing continues at step 504 to determine a neighborhood of cells excluding previously-searched cells, as discussed in connection with one or more embodiments of the present disclosure. At step 506, an initial cell in the enlarged search area is obtained, and POIs located in the identified cell are retrieved at step 506. At step 510, the retrieved results are filtered. At step 512, a determination is made whether or not all of the cells in the neighborhood of cells that comprise the enlarged search area have been searched. If not, processing continues at step 512 to identify the next cell in the neighborhood, and processing continues at step 506. If it is determined at step 516 that all of the cells in the neighborhood have been searched, processing continues at step 516 to return the searched results.

In accordance with embodiments of the present disclosure, a search includes cells that are determined to be the closest to an initial point. Each cell comprises a portion of the geographic area to be searched, the portion for a given cell being smaller than the search area. Application 102 can identify the initial point of the search, as well as the maximum size of the search area. A initial cell can be identified using the geographic location, e.g., latitude and longitude coordinates, of the initial point. The initial cell can be determined based on geographic coordinates corresponding to the initial, or center, point for the search, and the geographic coordinates and boundaries of the cells in the cell grid. Similarly, a POI's location relative to the cells in the cell grid can be determined dynamically, e.g., based on the geographic coordinates of the POI and the cells and cell boundaries, or determined statically. One or more tables storing information, e.g., a mapping between POI and cell, can be maintained to facilitate searching.

In accordance with one or more embodiments, the nearest-neighbor search uses a spiral approach, which includes circular rings used to identify a cell neighborhood and the cells included in the cell neighborhood. The search commences from an initial cell and proceeds to a periphery of the search area. As discussed above, the search area can grow incrementally and iteratively, excluding cells previously searched, and can be stopped at any point. In accordance with one or more embodiments, a cell neighborhood is determined using a value, R, to increment an initial or current radius. The cells in the neighborhood have a geometric shape, and the cell neighborhood has a geometric shape based on the shape of the cells in the neighborhood, e.g., a square or a rectangle. In accordance with one or more embodiments which use a spiral approach, cells located at corners of the cell neighborhood, such as the corners of a rectangular cell neighborhood can be excluded from a search. This approach can be useful in a case that the density of objects is higher closer to the initial point, for example.

In accordance with one or more embodiments, in a case of a spiral search, the search area is divided into the rings, which can be indexed from an initial index value, e.g., 1, with each ring being characterized by a radius associated with the ring. The radius may have a range of values starting from 0 as a radius that encompasses the cell, which contains an initial search point, for example. The radius value associated with a current ring can be incremented by the value of R to obtain the radius of a next ring. The value of R can be determined using cell dimension information, e.g., a minimum cell width and height in some unit of measure, e.g., meters. A ring can identify a cell neighborhood and can be used to identify the cells that belong to the cell neighborhood. The outermost ring can define a search area, for example.

In accordance with one or more such embodiments, the initial ring has a radius value of 0, and contains one cell, e.g., the cell that contains the initial point. Each subsequent ring has a radius determined by adding the value R to the current radius. Each radius contains the cells which have a distance from their center to the search area center less than or equal to the ring's radius. The cells that satisfy the condition in connection with a previous ring or a subsequent ring are excluded from the current ring. In accordance with one or more embodiments, a distance for a given cell can be calculated as the square of the actual distance multiplied by a normalizing coefficient.

When the radius value exceeds the search area radius, the radius is set to the search area radius. In accordance with one or more embodiments, this ring is the second-to-last ring. Cells that are not fully within the ring are excluded. The last ring processed for the current search has the same radius as that of the second-to-last ring, however, cells excluded from the second-to-last ring can be included in the last ring, and searched in the last ring. For example, the last search can include cells that intersect with, but are not fully contained within, the search area specified by the search radius. One example of such a cell included in the search performed in connection with the last ring, is a cell whose center lies outside the radius associated with the entire search area.

In accordance with one or more embodiments, a search ring is divided into four quadrants, e.g., right, left, upper and lower quadrants. The quadrants can be used to determine an order in which the cells in a cell neighborhood/ring are searched. By way of a non-limiting example, the center cell can be used as a horizontal transition point between the right and left quadrants. For example, the right quadrant contains the cells that have a horizontal position determined to be to the right of a horizontal position of the center cell in the current cell neighborhood, e.g., a cell determined to be in the right quadrant has a corresponding horizontal position which is greater than or equal to a horizontal position associated with the center cell. A cell's horizontal position can be identified using a coordinate value, e.g., the x-coordinate value, associated with the cell. Those cells which have an x-coordinate value which is greater than or equal to an x-coordinate value of the center cell are said to be located in the right quadrant, and the remaining cells, which have a horizontal position that is less than the horizontal position of the center cell, are said to fall outside the right quadrant, and to fall in the left quadrant. A cell can be determined to be in the upper quadrant based on whether or not the center of its top edge is farther from the search area center than the center of its bottom edge, for example. Similarly, for example, a cell can be determined to be in the lower quadrant based on whether or not the center of its bottom edge is farther from the search area center than the center of its top edge.

In accordance with at least one embodiment, in a spiral search, the cells in a cell neighborhood/ring are searched by quadrant and one row at a time, e.g., starting with a peripheral row, of the quadrant. The cells in the current row of the quadrant are searched from the inner-most, e.g., the one closest to the initial point, to the outer-most cell in the row.

For the first cell, the distance from the search center, e.g., the initial search point, to the cell edges is examined to identify a transition from the upper quadrant to the lower quadrant. At this point, a vertical position, e.g., a y-coordinate value, which identifies the transition point between the upper and lower quadrants, can be identified. The lower quadrant starts from the bottom row in the lower quadrant and ends at the point at which the vertical transition is reached.

In accordance with one or more embodiments, in a spiral search, a cell's distance from the initial search point and the current and previous ring radii can be used to identify, for a given row, the cells that are included in a current cell neighborhood. A distance associated with each cell can be determined from the initial search point and the cell's center point. For the cells in an outermost ring, the distance can be the distance from the nearest corner of the cell, rather than the cell's center. Cell distances can be used to determine which cells belong to the current ring, whether all of the cells in a current row have been processed, and/or whether to terminate the current row and start searching in a new row. If the cell's distance is greater than the current ring radius, a row break to a new row can be made. Alternatively, if the cell's distance is less than or equal to the previous ring's radius, the cell belongs to the previous ring, and need not be searched. If neither of two conditions is satisfied, the cell is considered to belong to the current ring, and can be searched.

The identification of cells in a row of the current ring can be used to minimize the degree to which cell distances are calculated for cells in a subsequent row in the current ring. For example, in processing one row in the current ring, the cells in that row searched in connection with a previous ring are skipped, until a first cell is identified that was not searched in connection with a previous ring. A horizontal position of this first cell can be retained, so that when starting a new row this horizontal position can be used to identify the cell in the new row that corresponds to the retained horizontal position, e.g., the next row can be started from the horizontal position rather than the initial search point. This approach can be used to avoid the repeated distance calculations. FIG. 7 provides an example using at least one cell from a previous row to identify cells in a subsequent row as part of a current ring in accordance with one or more embodiments of the present disclosure.

In the example of FIG. 7, three rows of cells are shown. Cells are determined to belong to a current ring, to belong to a previous ring, or to not belong to the current or a previous ring based on a calculated distance, or based on determinations made in the connection with a previous row in the current ring. Cells marked with an "X" are determined, using the calculated distance, to be a part of the current ring. Cells marked with an "<" are determined, using the calculated distance, to be a part of the previous ring. Cells marked with an ">" are determined, using the calculated distance, to not be a part of either a previous ring or a current ring. The distance can be calculated using a technique described herein or some other technique now known or later formulated. A distance is not calculated for cells designated with a "--" symbol.

In the first row shown in FIG. 7, the first four cells (reading from left to right) are marked with an "X", which indicates that a distance is calculated for these cells, and the calculated distance for each cell indicates that the cell belongs to the current ring. In the case of the fifth cell, a calculated distance associated with the cell indicates that the cell does not belong to either a previous ring or the current ring. The fifth cell in the first row may belong to a subsequent ring, for example. Based on the outcome associated with the fifth cell in the first row, there is no need to calculate the distance of the three cells to the right of the fifth cell, e.g., the sixth, seventh and eighth cells in the first row.

With regard to the second row, a distance is calculated for each of the first, second and third cells, and the calculated distance is used to determine that these cells belong to a previous ring. The distance calculated for each of the fourth, fifth, sixth and seventh cells in the second row is used to determine that the fourth, fifth and sixth cells belong to the current ring and that the seventh cell in the second row does not belong to the current or previous rings. Based on the determination for the seventh cell, there is no need to calculate a distance for the eighth cell in the second row.

The determinations made with respect to the second row can be used in processing the third row, such a distance calculation can be avoided for some of the cells, e.g., the first, second and third cells, of the third row. As previously described, a horizontal position of the first cell in the previous row determined to belong to the current ring is used to identify a cell in a subsequently-processed row that corresponds to the identified horizontal position. Distance calculations for the new row can commence with the identified cell. In the example shown in FIG. 7, the position of the fourth cell in the second row can be used to identify that distance calculations can be skipped for the first, second, and third cells in the third row, and that distance calculations can begin with the fourth cell in the third row.

FIG. 8 provides an example of rings and cells contained in a given ring used in a spiral search in accordance with one or more embodiments of the present disclosure. The nomenclature, "n:n" is used as a designation for each cell, where the first "n" identifies a ring and the second "n" represents a search sequence within a given ring. For example, "3:4" identifies that the cell belongs to the third ring and is the fourth cell in the third ring to be searched. Traversing the cells in the grid starting with the initial cell in the initial ring, designated as "1:1", it can be seen that the traversal takes a spiral form. In addition, it is also possible to visualize a ring, and the cells in each ring. As can be seen, the radius associated with a subsequent ring is incrementally larger than the radius of the previous ring. It can also be seen that processing of cells previously processed in connection with a previous ring can be avoided when processing a current ring.

It should be apparent that any search sequence can be used with embodiments of the present disclosure. In the example of FIG. 8, for a given ring, the search sequence commences with the upper and right quadrants, such that cells in the upper quadrant are searched and the search proceeds to the cells located in the right quadrant. With respect to the third ring processed, for example, the search of the upper and right quadrants involve the cells designated with "3:1", "3:2" and "3:3". The transition between the upper and lower quadrants in the example is between the cells "3:3" and "3:5". Thus, after the "3:3" cells is processed, processing continues with the lower and right quadrants, starting with the "3:4" cell and continuing with the "3:5" cell. A sequence which mirrors the sequence just discussed can be used with the left quadrant, with cells in the upper and left quadrants being searched, e.g., the "3:6" and "3:7" cells, and then the lower and left quadrants being processed, e.g., "the cells designated as the "3:8", "3:9" and "3:10" cells.

In accordance with one or more embodiments, filtering can be performed by one or the other of the geographic database system 106 and the CSM 104, or both. The following provides examples of object classes and methods of an example Application Programming Interface (API) that can be used to perform a search in accordance with one or more embodiments of the present disclosure.

An IMapObjectsIterator class can be used, which defines a function used to iterate through the cells in a cell neighborhood and/or a search area. A SetQuery function can be used to set the search criteria, as well as a filter, for a given cell. The filter can be used to identify the objects in the given cell. Another example of a function, or method, that can be used with embodiments of the present disclosure is a function to determine a cell identifier, e.g., a unique identifier for the cell, given a set of world coordinates, e.g., GPS coordinates, a map identifier and a map layer identifier. A function can be used to get a bounding box for a given cell, using an obtained cell identifier. Another function can be used to obtain the cell identifiers for some number of cells that are adjacent to a given cell. A variation of such a function can return a single cell adjacent to a given cell in a given direction, e.g., north, south, east, west, northeast, northwest, southeast, etc.

A SetSpiralQuery method can be used to initiate a query, e.g., a spiral query. As input, the method takes an initial search point, which can be expressed in world coordinates, e.g., GPS coordinates, and a search distance, which can be expressed in a unit of measure such as meters. A boolean value can be passed to the method, which can be used as a filtering switch, e.g., to turn filtering by the database system 106 on or off. Such filtering can be used, for example, in a case that some portion of a current cell being searched lies outside the search area. The coordinates of each object, e.g., a POI, can be examined to determined whether object lies inside or outside the search area, so that only those objects that lie inside the search area are provided to the CSM 104. In so doing, objects that are located outside the search area can be skipped, for example. Such filtering can be used, for example, when the search distance is fixed. If, however, the search distance is not limited, e.g., the search is terminated after a sufficient number of objects are retrieved. In such a case, there may not be a need for geographic database system 106 to filter retrieved objects, and the boolean flag can be set to "off". In the case of an "unlimited" search area, the distance input can be set to a large value.

A GetCurrentSpiralIndex method returns the current ring index. This method can be used to detect a transition from one ring to the next. A GetCurrentSpiralRadius method returns the current ring radius, e.g., in meters. As discussed above, the radius of the last two rings can be the same. A GetSpiralDeltaR returns the value, R, used to increment the ring radius. The returned value can be used to increment the current radius by R for a next ring, for example.

In accordance with one or more embodiments, it is possible to skip one or more rings in a case that it is determined that the ring contains a number of "empty" cells, e.g., cells which have few if any objects. In such a case, the radius can be incremented by more than R, and the ring index can be incremented by more than 1. Conversely, the value by which the radius is incremented can be less than R, such as in a case when the search is approaching a search area boundary.

A CNearestSearchTool class can be used to perform a search on layer groups, e.g., on multiple layers simultaneously. This can be used to search for POIs in multiple categories, for example. A ExecuteSearch method of the class accepts a group index and search parameters, which can be defined using a SearchParams data structure. The result of a search can be stored in a container and can be fetched by GetNumFound and GetFoundObject methods, for example. The class can support the incremental searching disclosed herein, including circular and spiral searching. An area type variable, area_tp, which is part of the SearchParams data structure can be set to identify a searching type, e.g., "SPIRAL_SRCH" in a case of spiral searching. A boolean flag, unlimited_area, can be used to identify a search area as "unlimited". As previously discussed, an unlimited search area can be used to search until a number of objects are found. If this flag is set, a search_distance value is ignored and object filtering can be switched off, for example.

When a search is performed on multiple layers, the rings grow for all layers in parallel. In general, the cell sizes of layers in the group may differ from each other. In this case the search tool attempts to maintain the current ring radii for all layers as close as possible.

A search can be monitored, e.g., by a user of application 102 or application 102, and controlled via a search notifier object. An abstract class CNearestSearchNotifier can be used for this purpose. A subclass can be derived from the abstract class to create a customized notifier. When a notifier member of SearchParams structure is set, a notifier method corresponding to an identified event is invoked. For example, a CNearestSearchNotifier::Object method can be called after a retrieved object is processed. The notifier can be invoked regardless of whether the object is accepted as part of the search results, for example. By way of another non-limiting example, a CNearestSearchNotifier::Ring method can be called after each ring is processed. When the search involves more than one layer, the Ring method can be called when the ring is processed on a set of layers, rather than for each layer, for example. A notifier method, e.g., an Object or Ring notifier method, can return a response to a notification in the form of a Boolean value, which can be used to determine whether or not to continue or terminate a search. For example, if a returned value is TRUE, a current search can be continued, and if the value is FALSE, the search is terminated.

A current state of a search can be queried using CNearestSearchTool class methods. A GetNumFound( ) function returns a number of objects currently stored in the search results container. A GetNumIterated( ) returns a number of objects that have been iterated. Since not all of the objects are accepted as part of the search results, e.g., as a result of filtering, the number of objects iterated can be greater than or equal to the number of objects stored in the search results container, for example.

A GetNumReliable( ) function returns an estimated number of objects considered to be the closest objects contained in the search results. When the requested number of objects is placed into the results container, not all of them are the objects that are actually the closest objects. As the search goes on, some objects may be replaced by better ones. This may occur in a case that the rings are not perfect circles, e.g., in a case that a ring is defined by the rectangular cells belonging to the ring, and the cells of next ring may contain an object, which is closer to the search center than some objects found in the current ring. This is one reason that a search might be continued even in a case that a number of objects found exceeds a threshold number. Continuing the search facilitates a determination as to whether or not objects may have been missed in the previous iterations.

One approach that can be used to determine whether to terminate a search is to base the decision to terminate a search on a number of found objects together with the lack of objects fount in a search of a current ring. More particularly, a search can be terminated once a sufficient number of objects are found and a search of a current ring yields few, if any additional and/or better objects. This approach, however, requires that at least one ring is searched with no meaningful search results being generated from the ring. Such an approach has drawbacks, which are readily apparent. Alternatively, the GetNumReliable method can be used to identify a point in the search at which the search can be terminated and processing an unnecessary last ring can be avoided. The method returns an estimated number of objects which are likely to be the closest to the center point of the search. The number can be compared to a number of objects requested to determine whether or not to terminate the search. In accordance with one or more embodiments, the method uses an empirical approach to provide the estimate. Application of the empirical formula can be commenced after a certain number of rings, e.g., the third ring, have been processed. The number of reliable objects can be updated for each ring processed, for example. The information provided by this function can assist the user of application 102, and/or application 102 alone, the determine whether or not to terminate the search.

Embodiments of the present disclosure can be implemented within a general purpose microprocessor, or other processing device. If implemented in software, the techniques may be embodied as instructions, or program code, on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform, and/or to be configured to perform, functionality described in this disclosure.

By way of further non-limiting examples, one or more disclosed embodiments might be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter. The disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A computer-implemented method for accessing information from a geographic database, said method comprising:
   receiving a search request, said search request identifying search criteria including an initial point;
   identifying, using said initial point, a neighborhood of cells from a grid of cells associated with a geographic database;
   searching said geographic database one cell at a time from said neighborhood to retrieve a number of points of interest (POIs) from a plurality of POIs identified in said geographic database, each POI retrieved having a corresponding location determined to be in a cell of said neighborhood, wherein searching said geographic database one cell at a time is performed until a predetermined number of POIs are retrieved or until all cells in said neighborhood have been searched to retrieve a number of POIs of said plurality, wherein after all cells of said neighborhood have been searched, said neighborhood is referred to as a previous neighborhood;
   identifying a new neighborhood of cells from the grid of cells, the new neighborhood of cells comprising cells other than the cells in said previous neighborhood; and
   searching said geographic database one cell at a time from said new neighborhood to retrieve a number of POIs of said plurality, each POI retrieved having a corresponding location determined to be in a cell of said new neighborhood;
   wherein said new neighborhood of cells corresponds a new geographic area, the new geographic area defined using said initial point and a distance from said initial point, the distance being larger than a distance used to define a geographic area corresponding to said previously-searched neighborhood of cells.

2. The method of claim 1, wherein said searching said geographic database further comprises:
   identifying a current cell of said neighborhood of cells;
   performing a search of said geographic database to retrieve a number of POIs of said plurality, each of the retrieved POIs having a corresponding location in said current cell; and
   filtering POIs of said plurality retrieved for said current cell using said search criteria, to generate a result set of POIs for said current cell.

3. The method of claim 1, wherein said identifying a neighborhood of cells further comprises:
   identifying a geographic area using said initial point and a distance from said initial point;
   identifying said neighborhood of cells from said grid of cells, said neighborhood corresponding to at least a portion of said identified geographic area.

4. The method of claim 1, wherein said searching said geographic database further comprises searching said geographic database one cell at a time from said new neighborhood until a predetermined number of POIs are retrieved.

5. The method of claim 1, wherein said searching said geographic database further comprises searching said geographic database one cell at a time from said new neighborhood until all cells in said new neighborhood have been searched to retrieve a number of POIs of said plurality.

6. The method of claim 1, said identifying a new neighborhood of cells further comprising:
   identifying a new geographic area using said initial point and a distance from said initial point;
   identifying said new neighborhood of cells from said grid of cells, said new neighborhood corresponding to at least a portion of said identified geographic area.

7. The method of claim 6, wherein said distance from said initial point is greater than a distance from said initial point used to identify a geographic area corresponding to a previously-searched neighborhood of cells.

* * * * *